(12) United States Patent
Yang et al.

(10) Patent No.: US 11,240,893 B2
(45) Date of Patent: Feb. 1, 2022

(54) DIMMER WITH A POWER SUPPLY CIRCUIT

(71) Applicant: EATON INTELLIGENT POWER LIMITED, Dublin (IE)

(72) Inventors: Lin Yang, Jiangsu (CN); Lily Du, Shanghai (CN); Haidong Zhang, Shanghai (CN); Chuanchuan Zhuang, Shanghai (CN); Kevin Zhong, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/675,868

(22) Filed: Nov. 6, 2019

(65) Prior Publication Data

US 2021/0136885 A1    May 6, 2021

(51) Int. Cl.
*H05B 45/37*      (2020.01)
*H02J 9/06*       (2006.01)
*H05B 45/10*      (2020.01)

(52) U.S. Cl.
CPC .............. *H05B 45/37* (2020.01); *H02J 9/061* (2013.01); *H05B 45/10* (2020.01)

(58) Field of Classification Search
CPC ...... H05B 39/044; H05B 45/10; H05B 39/06; H05B 45/31; H05B 45/37; H05B 47/10; H05B 47/175; H05B 47/185; H05B 47/19; H05B 45/375; H05B 47/105; H05B 47/11; H05B 45/3725; H05B 45/38; H05B 47/195; H05B 45/20; H05B 47/16; H05B 45/12; H05B 45/395; H05B 47/115; H05B 45/325; H05B 45/385; H05B 47/13; H05B 33/00; H05B 45/00; H05B 45/3575; H05B 45/3578; H05B 47/125; H05B 45/36; H05B 45/50; H05B 45/24; H05B 45/382; H05B 45/60; H05B 47/18; H05B 45/46; H05B 47/165; H05B 31/50; H05B 39/048; H05B 39/086; H05B 39/088; H05B 41/2806; H05B 41/3924; H05B 45/18; H05B 45/315; H05B 45/39; H05B 47/20; H05B 47/24; H05B 47/25; H05B 39/083;
(Continued)

(56) References Cited

U.S. PATENT DOCUMENTS 8,698,407 B1\*  4/2014  Chen ..................... H05B 45/395
                                            315/193
10,080,273 B1\* 9/2018  Slivka ..................... H02M 1/32
(Continued)

*Primary Examiner* — Monica C King
(74) *Attorney, Agent, or Firm* — Eckert Seamans Cherin & Mellott, LLC

(57) ABSTRACT

A dimmer includes a power supply circuit including a current limiter and a switch, the power supply circuit electrically coupled to a power source and a load, where current is channeled via the current limiter during a power-on of the dimmer and via the switch during operation of the dimmer after the power-on, a triode for alternating current (TRIAC) control circuit electrically coupled to the power source and the load, where the TRIAC control circuit is structured to control operation of a TRIAC configured to control an amount of power supplied to the load; and a processing unit electrically coupled to the power supply circuit and the TRIAC control circuit, where the processing unit is structured to control the switch and the TRIAC control circuit after the power-on.

20 Claims, 4 Drawing Sheets

(58) Field of Classification Search
CPC .. H05B 41/3927; H05B 45/22; H05B 45/397; H05B 45/56; H05B 47/12; H05B 47/135; H05B 47/26; H05B 47/28; H05B 41/28; H05B 41/38; H05B 45/14; H05B 45/28; H05B 45/34; H05B 45/345; H05B 45/357; H05B 45/40; H05B 45/44; H05B 45/48; H05B 45/54; H05B 47/14; H05B 47/155; H05B 47/17; H02M 3/07; H02M 1/0006; H02M 1/08; H02M 1/4266; H02M 1/44; H02M 5/293; H02M 1/32; H02M 3/33553; H02M 7/06; H02M 1/0045; H02M 1/10; H02M 1/15; H02M 1/36; H02M 1/4258; H02M 3/33507; H02M 5/2932; H02M 5/2935; H02M 7/103; H02M 7/125; H02M 7/213; H02M 7/217; H02M 7/219

See application file for complete search history.

(56) References Cited

U.S. PATENT DOCUMENTS

2006/0055679 A1\* 3/2006 Grinshpoon ......... H05B 39/085
   345/173
2017/0086281 A1\* 3/2017 Avrahamy ........... H05B 39/088

\* cited by examiner

DIMMER WITH A POWER SUPPLY CIRCUIT

BACKGROUND OF THE INVENTION

Field of the Invention

The disclosed concept relates generally to dimmers for use with a load, and in particular, to dimmers with a power supply circuit. The disclosed concept also relates to dimmer systems.

Background Information

Dimmers provide a dimming function for loads such as lights. Dimmers are generally placed between a power source and the load and control the nature of the power provided to the load. Very simple dimmers regulate the voltage provided to the load by, for example, dividing the voltage using a variable resistor. More recent dimmers cut off a part of each half-cycle of the power provided to the load. In some dimmers, the cut off is from a zero crossing in the power until a predetermined time after the zero crossing. Increasing the predetermined amount of time increases the amount of dimming. Cutting off a part of the waveform can be accomplished using a circuit component such as a TRIAC (triode for alternating current). The more recent dimmers provide increased power efficiency over prior dimmers that used a variable resistor. The power efficiency of a dimmer is a significant concern.

In addition to power efficiency, the cost and performance quality of dimmers is also a concern. Each component added to a dimmer increases its cost. However, adding components can also increase the performance quality of dimmers. It is difficult to address power efficiency, cost, or performance quality of a dimmer without negatively affecting one of the other concerns. For example, conventional 2-wire dimmers generally conduct current directly from a power source into their power supply circuit without adjusting the amount of current, thereby causing a surge of the high current into the loads and flickering of the loads during the power-on. A simple mechanism to reduce such flickering so as to enhance the quality of performance while keeping the cost of adding the mechanism at a minimum may be helpful.

There is room for improvement in dimmers.

There is also room for improvement in dimmer systems.

SUMMARY OF THE INVENTION

These needs, and others, are met by at least one embodiment of the disclosed concept in which a dimmer includes a power supply circuit including a current limiter and a switch, the power supply circuit electrically coupled to a power source and a load, where current is channeled via the current limiter during a power-on of the dimmer and via the switch during operation of the dimmer after the power-on, a triode for alternating current (TRIAC) control circuit electrically coupled to the power source and the load, where the TRIAC control circuit is structured to control operation of a TRIAC configured to control an amount of power supplied to the load; and a processing unit electrically coupled to the power supply circuit and the TRIAC control circuit, where the processing unit is structured to control the switch and the TRIAC control circuit after the power-on.

In accordance with an example embodiment of the disclosed concept, a dimmer system including a load, a hot conductor electrically coupled to a power source, a load conductor electrically coupled to the load; and a dimmer electrically coupled to the hot conductor and the load conductor. The dimmer includes: a power supply circuit comprising a current limiter and a switch, the power supply circuit electrically coupled to a power source and a load, where current is channeled via the current limiter during a power-on of the dimmer and via the switch during operation of the dimmer after the power-on; a triode for alternating current (TRIAC) control circuit electrically coupled to the power source and the load, wherein the TRIAC control circuit is structured to control operation of a TRIAC configured to control an amount of power supplied to the load; and a processing unit electrically coupled to the power supply circuit and the TRIAC control circuit, where the processing unit is structured to control the switch and the TRIAC control circuit after the power-on.

In accordance with an example embodiment of the disclosed concept, a method for providing power to a dimmer for use with a load includes: channeling input current via a current limiter of the dimmer during a power-on of the dimmer; activating a processing unit of the dimmer based at least in part on the power-on of the dimmer; channeling the input current via a switch and by-passing the current limiter, for operation of the dimmer after the power-on, where the activated processing unit causes the switch to be closed; and supplying power to the load by controlling a triode for alternating current (TRIAC) control circuit of the dimmer.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
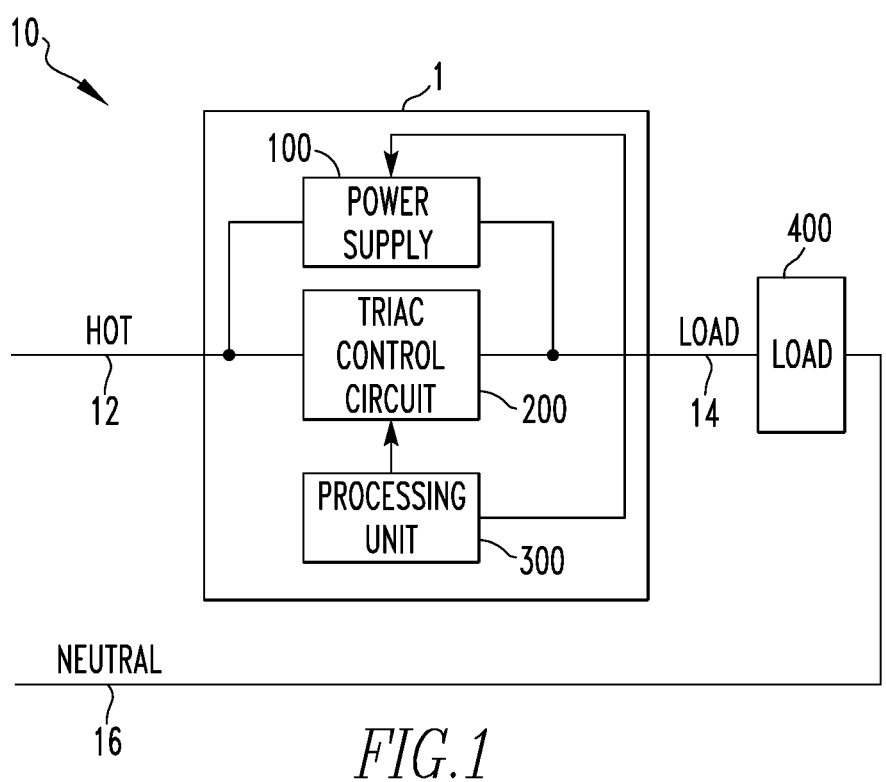
FIG. 1 is a schematic diagram of a dimmer system including a dimmer in accordance with an example embodiment of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the term "number" shall mean one or an integer greater than one (i.e., a plurality).

Dimmers may require only a low amount of current conducted into their power supply circuit during their power-on. However, conventional dimmers generally conduct current directly from a power source via a hot wire into their power supply circuit without adjusting the amount of current being conducted. As such, the unadjusted normal, high current may flow through loads connected to the dimmers, and surge of the high current into the loads may cause flickering of the loads during the power-on. Such flickering may reduce the power efficiency of the dimmer, decrease the life-cycle of the loads, and diminish the quality of performance of the dimmer in general.

Example embodiments of the disclosed concept address these issues. For example, the dimmer may include a power supply circuit which channels the normal, high current from the power source via a current limiter, e.g., a resistor, during the power-on. The amount of low current (e.g., 1 mA) having passed the resistor (e.g., 120 kΩ) may be sufficient to turn a power output to HIGH, but low enough so as not to cause flickering of a connected load during the power-on. Further, for the regular operations of the dimmer after the power-on, the power supply circuit may channel the normal, high current via a switch, e.g., a transistor, so as to provide sufficient power for the regular operations of the dimmer.

FIG. 1 is a schematic diagram of a dimmer system 10 including a dimmer 1 in accordance with an example embodiment of the disclosed concept. The dimmer system 10 includes a HOT conductor 12, a LOAD conductor 14, and a NEUTRAL conductor 16. The HOT conductor 12 may be electrically connected to a power source such as 120 Vac residential power or another suitable power source. The LOAD conductor 14 may be electrically connected to a load 400, e.g., a light. The dimmer 1 may be a 2-wire universal slide dimmer, and thus, the dimmer 1 may not be directly connected to the NEUTRAL conductor 16 as shown in FIG. 1. The NEUTRAL conductor 16 may be electrically coupled to the LOAD 400 to complete the AC power circuit. The dimmer 1 is structured to control dimming of the load 400 by controlling the nature of the power provided to the LOAD conductor 14. For example, in some example embodiments, the dimmer 1 is structured to cut off a part of the waveform provided to the LOAD conductor 14 each half-cycle. The power provided to the LOAD conductor 14 powers the load 400.

The dimmer 1 further includes a power supply circuit 100, a TRIAC control circuit 200, and a processing unit 300. The dimmer 1 may include other components, e.g., dimmer control elements, a load control circuit, etc, that are not shown in FIG. 1. The power supply circuit 100 is structured to supply power to the processing unit 300, which controls the dimmer during the operations of the dimmer. For example, during the power-on, the power supply circuit 100 provides the power and causes the power output, e.g., $V_{CC}$, to go HIGH. In another example, upon powering on of the dimmer, the power supply circuit 100 provides input voltage to the processing unit 300, which in turn activates and controls, e.g., the TRIAC control circuit 200. The TRIAC control circuit 200 is structured to receive waveforms, e.g., dimming signals, from the processing unit 300, and control the operation of the TRIAC Q3 and any other components of the TRIAC control circuit 200. The TRIAC Q3 may act as a bidirectional switch and control the amount of power supplied to the load 400. The processing unit 300 is structured to receive power from the power output, e.g., $V_{CC}$, and control the operation of the dimmer 1 after the power-on. Upon powering on, the processing unit 300 receives input voltage, e.g., 5V, from the power output and starts to operate. For example, the processing unit 300 may transmit a dimming signal, e.g., the DC voltage, to activate the TRIAC control circuit 200, detect zero-crossings, and transmit dimming signals to the TRIAC Q3 during the operation of the dimmer 1.

Figure 2:
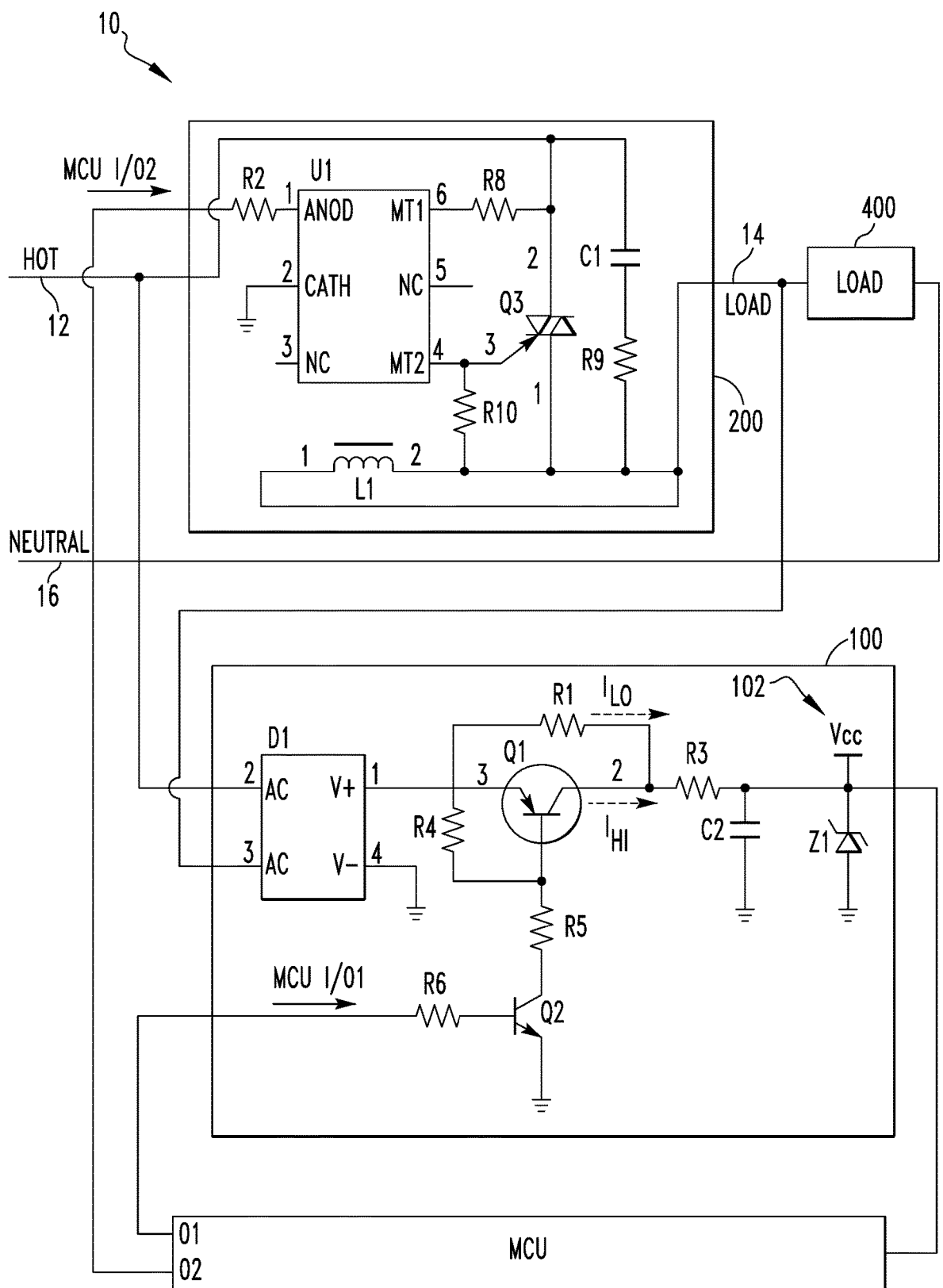
FIG. 2 is a schematic diagram of a dimmer system including a dimmer shown in more detail in accordance with an example embodiment of the disclosed concept.

FIG. 2 is a schematic diagram of the dimmer system 10 shown in more detail in accordance with an example embodiment of the disclosed concept. In the example embodiment shown in FIG. 2, the power supply circuit 100 is electrically coupled to the HOT conductor 12 and the LOAD conductor 14, and has a power supply output 102, e.g. Vcc. In some example embodiments, one or more DC voltages are output at the power supply output 102. Any suitable voltage may be output at the power supply output 102. In some example embodiments of the disclosed concept, 5V is output at the power supply output 102.

The power supply circuit 100 includes a bridge circuit D1, switches Q1 and Q2, resistors R1, R3, R4, R5 and R6, a smoothing capacitor C2, and a voltage regulator Z1. The bridge D1 is electrically coupled to the HOT conductor 12 at node 2 of the bridge circuit D1 and receives AC voltage from a power source via the HOT conductor 12. The bridge D1 then converts the AC voltage into DC voltage and outputs the DC voltage at node 1. The switches Q1 and Q2 may be bipolar junction transistors (BJTs), MOSFETs, CMOS, or any other components capable of acting as a switch.

The power supply circuit 10 is advantageous over conventional 2-wire dimmers in that unlike the conventional 2-wire dimmers that provide high current during both the power-on and regular operations of the dimmers, the power supply circuit 100 is structured so that a low current is conducted into the load 400 during the power-on of the dimmer 1 and a normal, high current is conducted to the load 400 after the power-on. During the power-on, the switches Q1, Q2 are open, and thus, the current is channeled through a current-limiting resistor R1, causing only a low amount of current $I_{LO}$ sufficient to turn Vcc into HIGH. Resistor R1 may have resistance of 120 kΩ, and the low current $I_{LO}$ may be 1 mA. With only the low current $I_{LO}$ conducting through the AC power circuit, any flickering of the load 400 during the power-on may be prevented. After the power-on, the power supply circuit 100 activates the processing unit 300, which in turn simultaneously supplies the DC voltage, e.g., 5V, to the switch Q2 and the TRIAC control circuit 200. With the DC voltage supplied, switch Q2 becomes closed and supplies the DC voltage to switch Q1 via the resistor R5. With both switches Q1 and Q2 closed, the current-limiting resistor R1 is jumped (i.e., by-passed) and the normal, high current $I_{HI}$ (e.g., 10 mA) is conducted into the load 400 via the switches Q1,Q2 and TRIAC Q3, thereby providing sufficient amount of current for regular operations of the dimmer 1. As such, the power supply circuit 100 supplies an appropriate amount of current to perform the tasks at hand, e.g., a power-on, normal operations, etc., by implementing a simple current-limiting and current-channeling mechanism, e.g., R1, Q1, Q2, etc.

By allowing only the low current $I_{LO}$ to be conducted to the load 400, the power supply circuit 100 may prevent a surge of the high current $I_{HI}$ (e.g., 10 mA) into the load 400, and thus, prevent any flickering in the load 400 during the power-on. By preventing unwanted flickering during the power-on, the power supply circuit 100 enhances the quality of performance of the dimmer 1, reduces wear and tear of the load 400, and decreases potential power waste. By providing two separate channels, separately supplying sufficient amounts of current during the power-on and normal operations of the dimmer 1, the power supply circuit 100 increases the power efficiency. Further, the power supply circuit 100 achieves this increased power efficiency and quality of performance by implementing a simple current-limiting and current-channeling mechanism, e.g., adding an inexpensive resistor R1, thereby keeping the cost of such improvement at a minimum.

Referring back to FIG. 2, the TRIAC control circuit 200 is electrically coupled between the HOT conductor 12 and the LOAD conductor 14 as shown in FIG. 2. The TRIAC control circuit 200 is structured to control the TRIAC Q3, which conducts current bidirectionally and controls the amount of power supplied to the load 400 via the LOAD conductor 14 based on a dimming control signal. The TRIAC control circuit 200 includes a coupler U1, the TRIAC Q3, an RF choke L1, a snubber circuit including C1 and R9, and resistors R2, R8, and R10, The coupler U1 may be an optocoupler, and electrically coupled to the processing unit 300, which controls the optocoupler U1. For example, the coupler U1 is structured to receive the dimming control signal, e.g., 5V signal, from the processing unit 300, and turn on in response to the dimming control signal. As such, the TRIAC control circuit 200 is inactive during the power-on and becomes active for the operation of the dimmer 1 after the power-on, e.g., upon closing of a switch Q1 (discussed in detail below).

The optocoupler U1 may include a light sensitive optical interface, e.g., a diode, a photo-transistor, a TRIAC, etc. The anode of the diode (not shown), e.g., an infra-red diode, in the optocoupler U1 may be coupled to the processing unit 300 via resistor R2 at node 1 of the optocoupler U1, and receives the dimming signal from the processing unit 300. The cathode of the diode may be coupled to the ground at node 2 of the optocoupler U1. Main terminal MT 1 of the TRIAC of the optocoupler U1 may be coupled to one of the main terminals of the TRIAC Q3 at node 6 of the optocoupler U1 via resistor R8. Main terminal MT 2 of the TRIAC of the optocoupler U1 may be coupled to the gate of the TRIAC Q3 and the RF choke L1 via resistor R10 at node 4 of the optocoupler U1. When the processing unit 300 is activated upon powering on of the dimmer 1, the processing unit 300 supplies DC voltage, e.g., 5V, to the anode of the diode of the optocoupler U1, and turns on the optocoupler U1. The diode of the optocoupler U1 may then emit infra-red light to the TRIAC of the optocoupler U1, and turn on the TRIAC. The TRIAC of the optocoupler U1 in turn supplies gate voltage to the TRIAC Q3, triggering the TRIAC Q3 to be turned on and begin to provide power to the load 400.

The RF choke L1 may be coupled to main terminal MT 2 of the optocoupler U1 and the LOAD conductor 14, preventing noises and interferences, e.g., high frequency AC signals.

The snubber circuit including capacitor C1 and resistor R8 prevents unwanted turn-on of the TRIAC Q3 due to internal capacitances between the main terminals and the gate of the TRIAC Q3.

The processing unit 300 is structured to control the operation of the dimmer 1, e.g., provide one or more control signals to control functionality of the dimmer 1. The processing unit 300 may include a processor and a memory. The processor may be, for example and without limitation, a microprocessor, a microcontroller, or some other suitable processing device or circuitry, that interfaces with the memory. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory.

The processing unit 300 may be coupled to the power supply circuit 100 and the TRIAC control circuit 200. The processing unit 300 may be coupled to the power output, i.e., Vcc, of the power supply circuit 100, for receiving DC voltage to operate the dimmer 1. One of the terminals, e.g., Terminal 02 of the processing unit 300 may be coupled to switch Q2 and another terminal, e.g., Terminal 01, of the processing unit 300 may be coupled to the optocoupler U1. After the power-on, the DC voltage is supplied to the processing unit 300 and the processing unit 300 starts to operate. At the same time, the processing unit 300 may provide the DC voltage to switch Q2 as shown by the arrow MCU I/01, and the switch Q2 which is electrically coupled to switch Q1, in turn, may turn on switch Q1 for continuous supply of normal high current during the normal operations of the dimmer 1 after the power-on.

Simultaneously, the processing unit 300 may provide DC voltage to the TRIAC control circuit 200 from terminal 01 as shown by the arrow MCU I/02 and begins to control the operation of the dimmer 1, e.g., the TRIAC Q3. For example, the processing unit 300 may be structured to generate and output a dimming control signal to the TRIAC control circuit 200. In some example embodiments, the dimming control signal may have an on-state and an off-state. In the off state, the dimming control signal is a constant voltage. In the on-state, the dimming control signal is a constant voltage that has a low pulse at predetermined intervals such as once each half-cycle of the power received via the HOT conductor 12. The low pulse is a predetermined time after each zero-crossing in the power received via the HOT conductor 12. The processing unit 300 is structured to control the length of the predetermined time. For example, by increasing the predetermined time, dimming of the load 400 may be increased and by decreasing the predetermined time, dimming of the load 400 may be decreased. Further, the processing unit 300 may be structured to detect zero-crossings in power received via the HOT conductor 12 and may generate a zero-crossing signal, such as a square wave that is toggled at each detected zero-crossing in power received via the HOT conductor 12.

Figure 3:
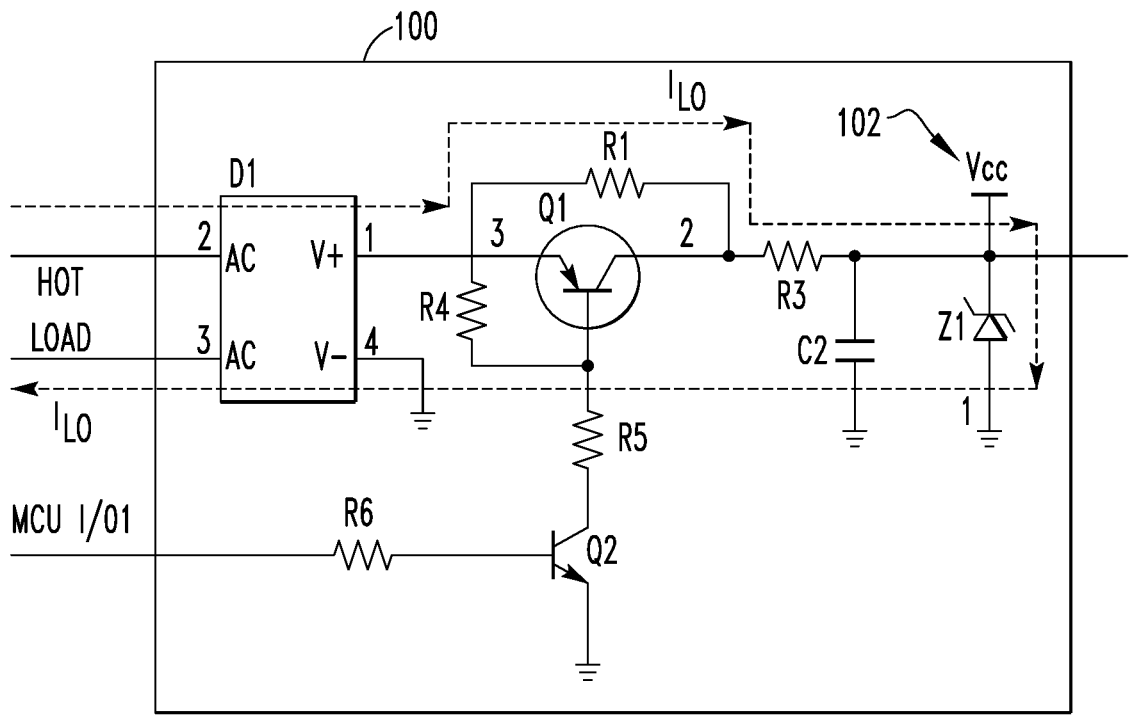
FIG. 3 is a schematic diagram including an example current loop during power-on of a dimmer in accordance with an example embodiment of the disclosed concept.

FIG. 3 is an example current loop 104 created during the power-on of the dimmer 1 in accordance with an example embodiment of the disclosed concept. In the example embodiment shown in FIG. 3, a current loop created during the power-on includes the HOT conductor 12, the bridge circuit D1, the current limiting resistor R1, resistor R3, zener diode Z1, the ground, the bridge circuit D1, the LOAD conductor 14, the load 400, and the NEUTRAL conductor 16. That is, the current flow during the power-on may be: the HOT conductor 12→the bridge circuit D1→the current-limiting resistor R1→resistor R3→the voltage regulator Z1 (i.e., output voltage $V_{CC}$)→the ground→the bridge circuit D1→the LOAD conductor 14→the load 400→the Neutral conductor 16. Since the low current $I_{LO}$ becomes the load current $I_{LO}$ flowing through the load 400, any flickering of the load 400, which may be caused due to a surge of the normal, high input current $I_{H1}$ (e.g., 10 mA), may be prevented during the power-on.

Figure 4:
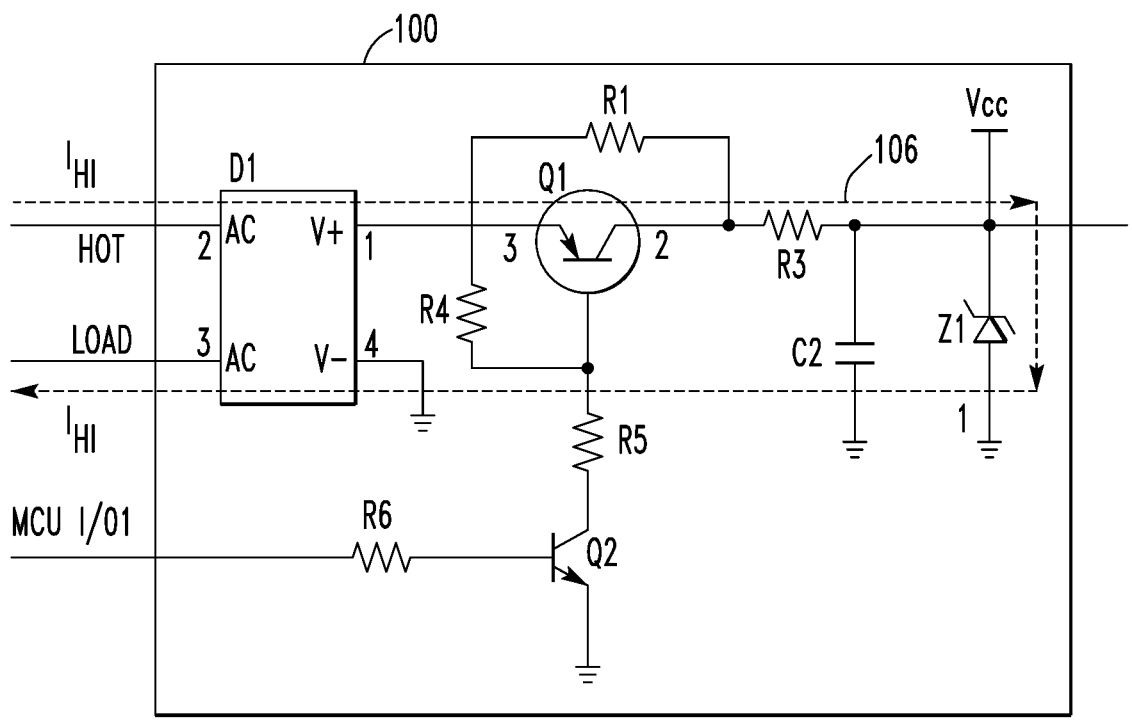
FIG. 4 is a schematic diagram including an example current loop during operation of a dimmer after a power-on in accordance with an example embodiment of the disclosed concept.

FIG. 4 is an example current loop 106 created during normal operation of the dimmer 1 after the power-on in accordance with an example embodiment of the disclosed concept. In the example embodiment shown in FIG. 3, a current loop during the regular operation of the dimmer 1 after the power-on includes the HOT conductor 12, the bridge circuit D1, switch Q1, resistor R3, zener diode Z1, the ground, the bridge circuit D1, the LOAD conductor 14, the load 400, and the NEUTRAL conductor 16. That is, the current loop after the power-on may be: the HOT conductor 12→the bridge circuit D1→switch Q1→resistor R3→the voltage regulator Z1 (i.e., output voltage $V_{CC}$)→the ground→the bridge circuit D1→the LOAD conductor 14→the load 400→the Neutral conductor 16. As such, the high input current Ix' (e.g., 10 mA) flows through the load 400, thereby providing sufficient amount of current for the normal operation of the dimmer 1. During the post-power-on operation of the dimmer 1, an RF choke, a snubber circuit, etc., may prevent any flickering due to internal capacitances, EMI interferences, etc.

Figure 5:
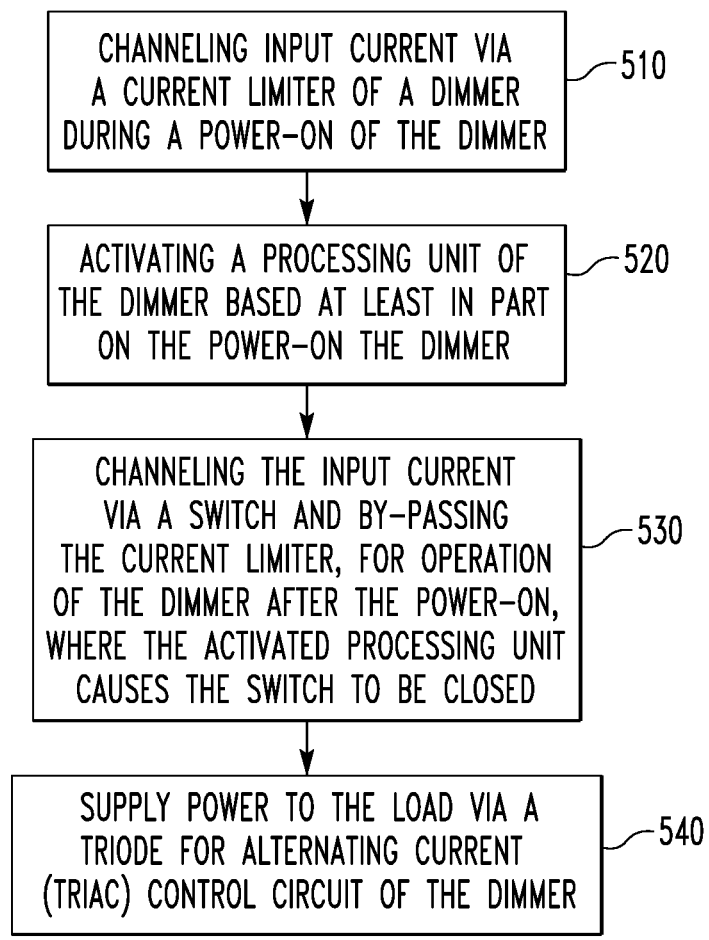
FIG. 5 illustrates a method for providing power to a dimmer for use with a load in accordance with an example embodiment of the disclosed concept.

FIG. 5 is a flow chart for a method 500 for providing low input current during the power-on of a dimmer in accordance with an example embodiment of the disclosed concept. The dimmer may be the dimmer 1 as described with reference to FIGS. 1-4.

At 510, a power supply circuit of the dimmer channels input current via a current limiter of the dimmer during a power-on of the dimmer. The power supply circuit may be the power supply circuit 100 as described with reference to FIGS. 1-4. The current-limiter may be a resistor (e.g., resistor R1 described in reference to FIGS. 1-4) and have resistance of 120 kΩ.

At 520, the power supply circuit activates a processing unit of the dimmer based at least in part on the power-on of the dimmer. Upon powering on, the output power, e.g., $V_{CC}$, turns HIGH, and the power supply circuit starts to provide DC voltage, e.g., 5V, to the processing unit. Upon receiving the DC voltage, the processing unit starts to operate and controls the operations of the dimmer 1, e.g., controls a triode for alternating current (TRIAC) control circuit. The processing unit may be the processing unit 300 as described with reference to FIGS. 1 and 2.

At 530, the power supply circuit channels the input current via a switch and by-passing the current limiter, for operation of the dimmer after the power-on, where the activated processing unit causes the switch to be closed. The switch may be switch Q1 as described with reference to FIG. 2. The processing unit may cause the switch Q1 to be closed by providing DC voltage to another switch, e.g., Q2 as described with reference to FIG. 2.

At 540, the dimmer supplies power to the load via a triode for alternating current (TRIAC) control circuit of the dimmer. The TRIAC control circuit of the dimmer may be the TRIAC control circuit 200 as described with reference to FIGS. 1 and 2. The TRIAC control circuit may be structured to control a TRIAC, which conducts current bidirectionally and controls the amount of power supplied to the load via a LOAD conductor based on a dimming control signal transmitted from the processing unit.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A dimmer comprising:
   a power supply circuit comprising a current limiter and a switch, the power supply circuit electrically coupled to a power source and a lighting load, wherein current is channeled to the lighting load via the current limiter during a power-on of the dimmer and via the switch during operation of the dimmer after the power-on;
   a triode for alternating current (TRIAC) control circuit electrically coupled to the power source and the lighting load, wherein the TRIAC control circuit is structured to control operation of a TRIAC configured to control an amount of power supplied to the lighting load; and
   a processing unit electrically coupled to the power supply circuit and the TRIAC control circuit, wherein the processing unit is structured to control the switch and the TRIAC control circuit after the power-on.

2. The dimmer of claim 1, wherein the current limiter is a resistor.

3. The dimmer of claim 1, wherein the switch is open during the power-on.

4. The dimmer of claim 3, wherein a load current during the power-on is a low current which has passed through the current limiter.

5. The dimmer of claim 1, wherein the TRIAC is inactive during the power-on.

6. The dimmer of claim 1, wherein the switch is closed during the operation of the dimmer after the power-on.

7. The dimmer of claim 1, wherein the processing unit is electrically coupled to the switch via a second switch and supplies DC power to the second switch.

8. The dimmer of claim 7, wherein the processing unit provides DC voltage to the second switch after the power-on.

9. The dimmer of claim 8, wherein the second switch triggers the switch to become closed.

10. The dimmer of claim 8, wherein the TRIAC becomes active upon the closing of the switch.

11. The dimmer of claim 1, wherein the power supply circuit further comprises a bridge circuit structured to convert AC voltage into DC voltage.

12. The dimmer of claim 11, wherein the DC voltage is supplied to the processing unit to activate the processing unit.

13. The dimmer of claim 1, wherein the switch comprises a bipolar junction transistor.

14. The dimmer of claim 1, wherein the TRIAC control circuit comprises at least a coupler structured to receive a dimming control signal from the processing unit.

15. The dimmer of 14, wherein the dimming control signal comprises a DC voltage.

16. A dimmer system comprising:
   a lighting load;
   a hot conductor electrically coupled to a power source;
   a load conductor electrically coupled to the load; and
   a dimmer electrically coupled to the hot conductor and the load conductor, the dimmer comprising:
      a power supply circuit comprising a current limiter and a switch, the power supply circuit electrically coupled to a power source and the lighting load, wherein current is channeled to the lighting load via the current limiter during a power-on of the dimmer and via the switch during operation of the dimmer after the power-on;
      a triode for alternating current (TRIAC) control circuit electrically coupled to the power source and the lighting load, wherein the TRIAC control circuit is structured to control operation of a TRIAC configured to control an amount of power supplied to the lighting load; and
      a processing unit electrically coupled to the power supply circuit and the TRIAC control circuit, wherein the processing unit is structured to control the switch and the TRIAC control circuit after the power-on.

17. The dimmer system of claim 16, wherein the current limiter is a resistor.

18. The dimmer system of claim 16, wherein the switch is open during the power-on.

19. A method for providing power to a dimmer for use with a lighting load, the method comprising:
   channeling input current to the lighting load via a current limiter of the dimmer during a power-on of the dimmer;
   activating a processing unit of the dimmer based at least in part on the power-on of the dimmer;
   channeling the input current via a switch and by-passing the current limiter, for operation of the dimmer after the power-on, wherein the activated processing unit causes the switch to be closed;
   supplying power to the lighting load by controlling a triode for alternating current (TRIAC) control circuit of the dimmer.

20. The method of claim 19, wherein channeling the input current via the current limiter comprises causing the switch to remain open during the power-on.

\* \* \* \* \*